Nov. 29, 1938.     G. K. HULL ET AL     2,138,676
MACHINE FOR CUTTING BY HEAT PIPES OR SIMILAR
OBJECTS ANGULARLY CROSSWISE THEREOF
Filed March 17, 1937     4 Sheets-Sheet 4
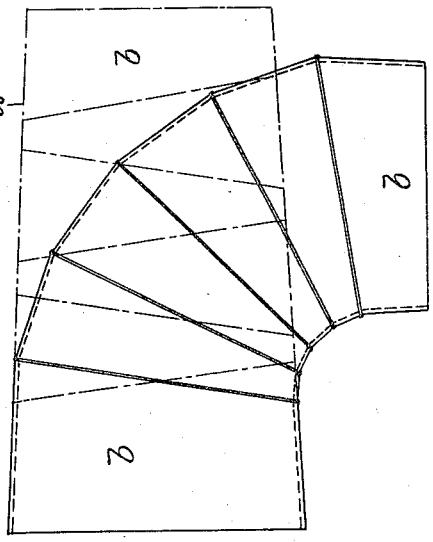
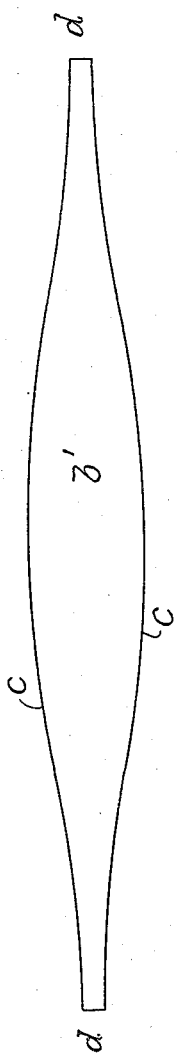
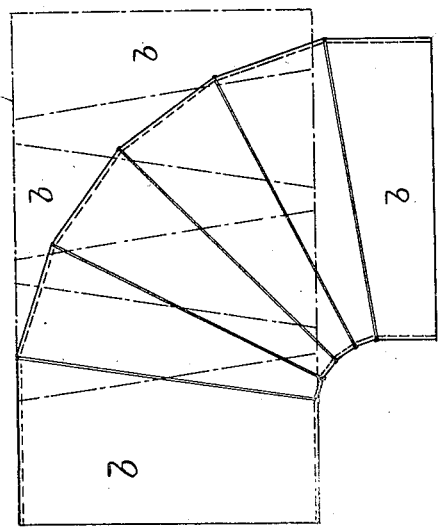
INVENTORS
George K. Hull
Ralph L. Drake
BY
S. C. Yeaton
ATTORNEY Patented Nov. 29, 1938

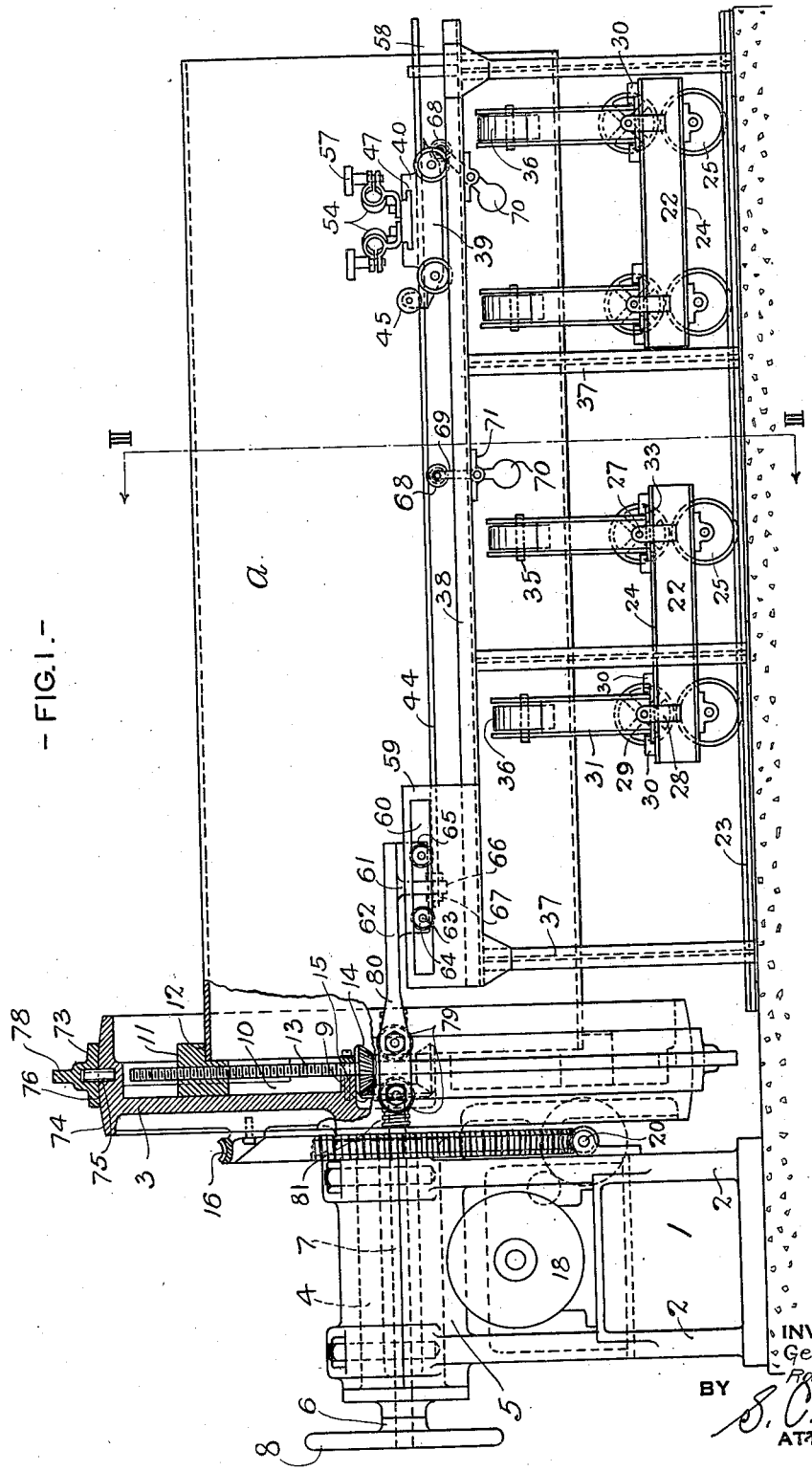

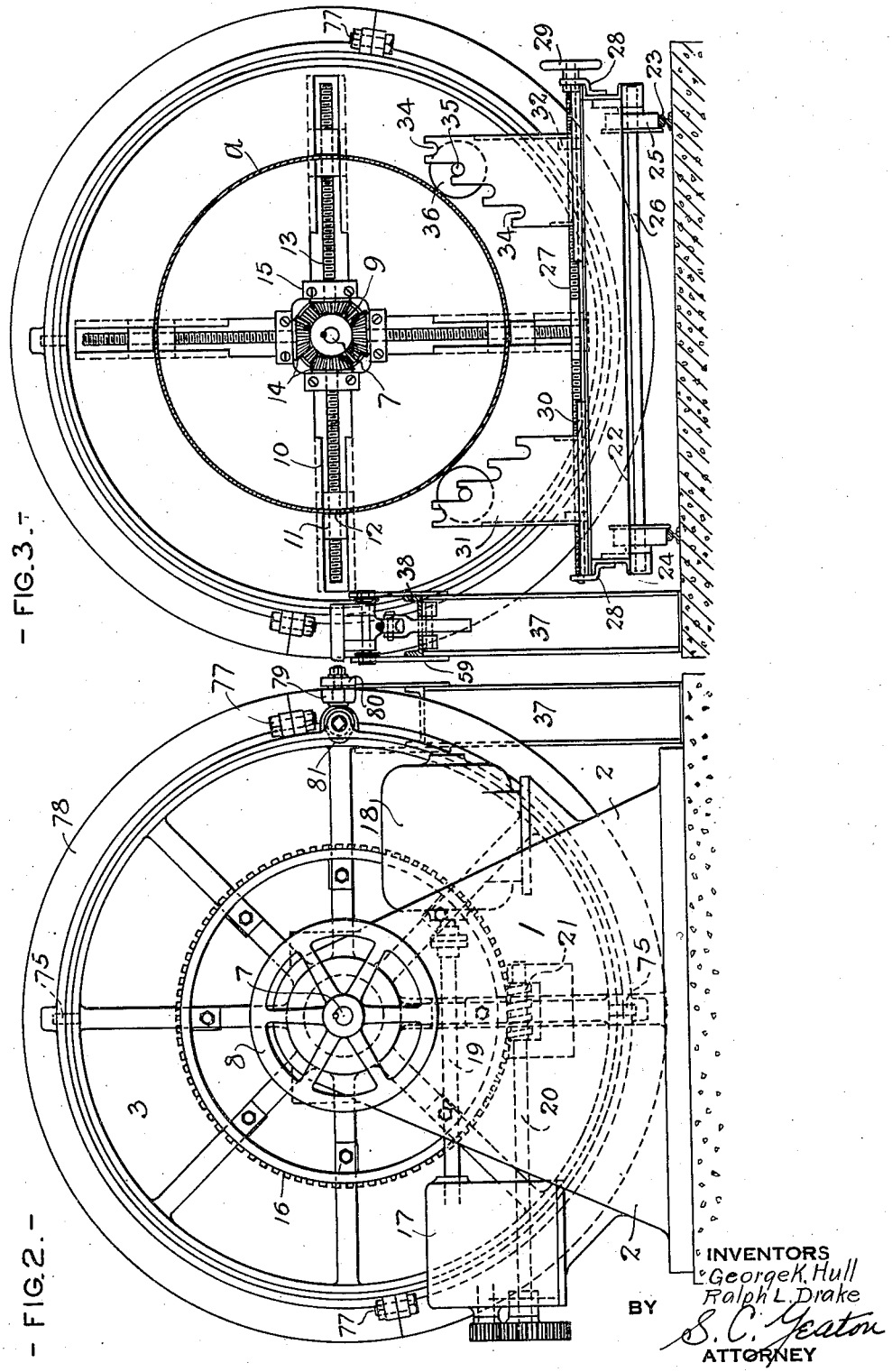

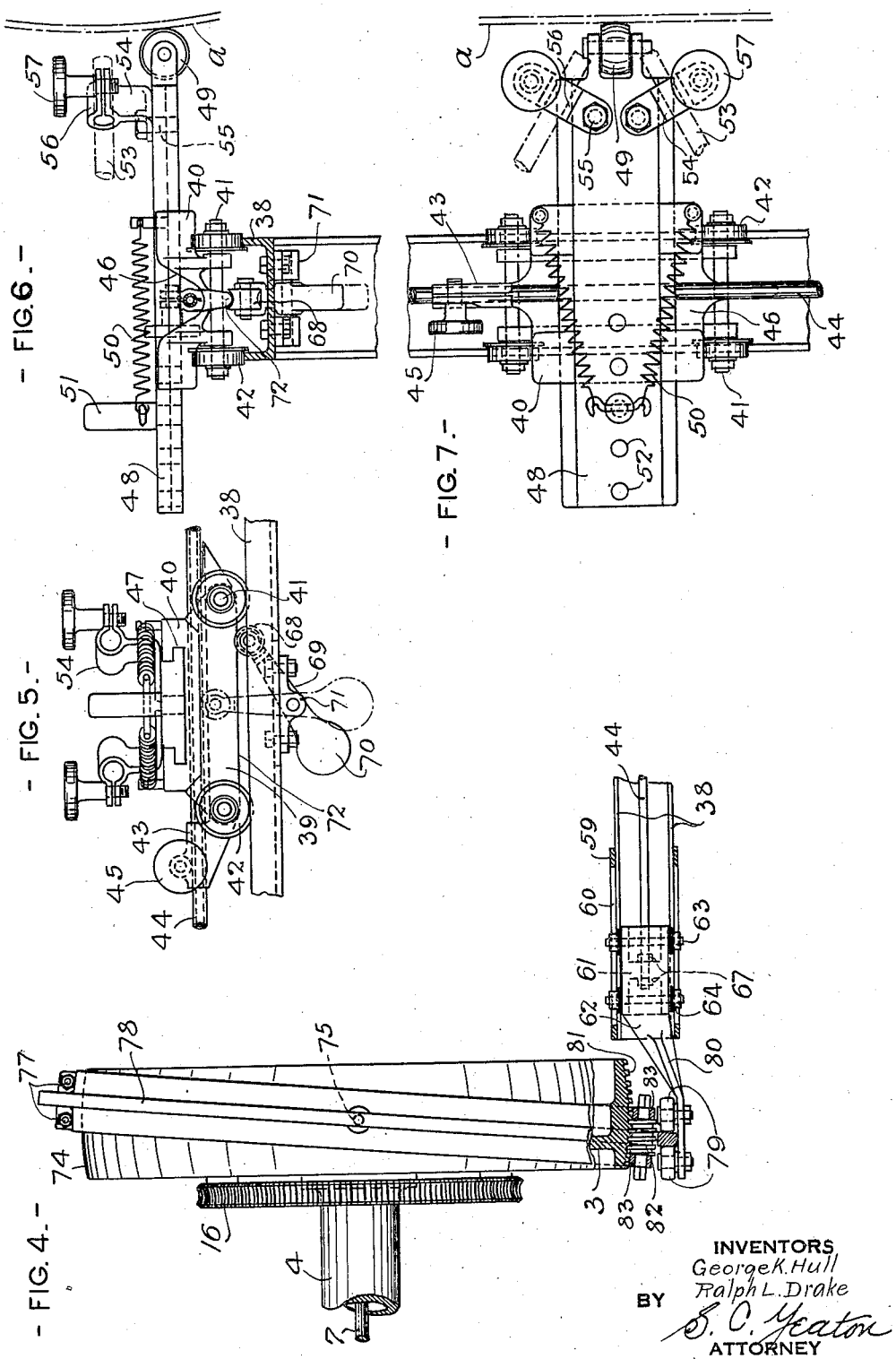

2,138,676

UNITED STATES PATENT OFFICE 2,138,676

MACHINE FOR CUTTING BY HEAT PIPES OR SIMILAR OBJECTS ANGULARLY CROSSWISE THEREOF

George K. Hull, Fredonia, and Ralph L. Drake, Dunkirk, N. Y., assignors to American Locomotive Company, New York, N. Y., a corporation of New York Application March 17, 1937, Serial No. 131,316

5 Claims. (Cl. 266—23)

This invention relates to a machine for cutting by heat a pipe or similar object angularly crosswise thereof. The principal object of the invention is to provide a machine that will reduce the cost of manufacture of pipe specials such as angular cuts and angular bends.

Other and further objects of and advantages achieved by the present invention will be apparent from the following description thereof and the claims appended hereto.

Referring to the drawings forming a part of this application, Figure 1 is a front elevation partly in section and partly broken away showing the machine of the present invention and a pipe supported thereby, the machine being adjusted for cutting in a radial plane and the heat-applying means for effecting the cut not being shown; Fig. 2 is an end view of the machine of Fig. 1 viewed from the left; Fig. 3 is a sectional view on the line III—III of Fig. 1; Fig. 4 is a view of part of the machine in plan partly in section and partly broken away showing the means for operating the heat-applying means adjusted from the position shown in Fig. 1 to a position to effect an angular cut; Fig. 5 is a view of part of the machine showing in front elevation the means for supporting the heat-applying means and some of its associated parts, the heat-applying means not being shown; Fig. 6 is an end view partly in section of the parts shown in Fig. 5 viewed from the right with certain other parts added, a section of the pipe and of the heat-applying means being shown in dot and dash lines; Fig. 7 is a plan view of the parts shown in Fig. 6; Figs. 8 and 9 illustrate in dot and dash lines pipes marked for cutting by the machine of the present invention and in full lines the pipe after having been cut into the required sections and reassembled to form a pipe bend; and Fig. 10 shows the manner of cutting a pipe section from a flat sheet according to prior practice.

The cutting of the pipe is preferably done by means of an oxy-acetylene torch or torches, but the invention is not restricted to any particular heat-applying means for effecting the cutting of the pipe and other suitable heat-applying means, such for instance as an electric arc, may be employed. Therefore the term "torch", when employed in the claims, will be understood to refer to any suitable heat-applying means and to be otherwise in no way restrictive.

The machine of the present invention, indicated generally by the reference numeral 1, comprises a frame 2 for supporting mechanism which in turn supports one end of the pipe that is to be cut, indicated by the letter $a$. The frame 2 is disposed at the left end of the machine, as viewed in Fig. 1 (the terms right and left being hereafter employed with reference to the machine as viewed in Fig. 1). The mechanism carried by this frame comprises a drum 3 disposed at the right of the frame 2 and a hollow shaft 4 integrally formed therewith and mounted in a bearing 5 carried by the frame 2. A chuck, indicated generally by the reference numeral 6, is carried by the drum 3 and the shaft 4. It comprises a shaft 7 mounted in and extending through the shaft 4 and provided at its left extended end with a hand wheel 8 and at its right extended end with a bevel gear 9. The drum is centrally hollowed out to receive this gear and four dove-tail grooves 10 radially disposed at 90 degrees apart are formed in the drum 3.

A dove-tail shaped block 11 is slidably mounted in each of the grooves thereby providing four blocks, each block being diametrically opposed to one of the other blocks and each block being provided with a shoulder 12, the shoulders of oppositely disposed blocks being oppositely disposed whereby the end of the pipe $a$ at the left is engaged by the four shoulders at points equidistant apart. Each of the blocks 11 is provided with a threaded radial bore which engages the threaded portion of a radially disposed shaft 13. The four shafts 13 have each, upon its end adjacent the gear 9, a bevel gear 14 engaging the gear 9 and each shaft 13 adjacent its bevel gear is mounted in a block 15 secured to the drum 3. The blocks 11 are mounted on their respective shafts at equal distances from the center of the drum and the hand wheel 8, in an obvious manner, when turned in one or the other direction, will effect a movement of each block 11 radially in a corresponding manner to and from the center of the drum. By this mechanism the hand wheel may be operated to adjust the blocks for any size pipe, and when the shoulders 12 have been suitably adjusted to engage the particular size pipe, the blocks can be forced radially slightly inwardly by further turning of the wheel 8 in the proper direction to firmly grasp the pipe at a position centrally of the drum 3, that is to say, at a position where the axes of the drum and pipe coincide.

A relatively large worm wheel 16 is secured to the end face of the drum adjacent the frame 2. A variable speed transmission device 17 of any well-known or preferred type is supported on the frame 2 at the rear thereof, and an electric motor 18 is supported on the frame 2 at the front thereof. A transverse shaft 19 connects the motor 18 with the device 17, and a transverse shaft 20, having a worm 21 thereon engaging the worm wheel 16, connects the device 17 with the worm wheel 16 whereby the motor drives the drum 3 through the device 17. The device 17 may be adjusted to produce a speed of rotation of the pipe best suited for any particular instance. This is an important feature because the suitable speed for the drum will depend upon several factors, as for instance the intensity of the heat of the torch, the thickness of the wall of the pipe, the material of the pipe, and the diameter of the pipe. This last factor is of special importance, for, other things being equal, the lineal speed of the pipe, that is to say, the speed at which the successive points along the line that is to be cut are presented to the torch, should be substantially constant. Therefore to attain this result the speed of rotation of the pipe should decrease as the diameter of the pipe increases.

The machine thus far described provides means for supporting the pipe at one end and for rotating the pipe at a selected speed of rotation. The machine further comprises other means for supporting the pipe. To this end, one or more trucks 22 (two being shown in the present instance) are provided. The trucks run on tracks 23 which extend parallel to the axis of rotation of the drum 3 and pipe $a$. The trucks are similar and a description of one will therefore suffice.

The truck comprises a frame 24 and supporting wheels 25 carried on axles 26 journalled in suitable bearings in the frame. A screw shaft 27 is carried by the frame 24 transversely thereof in bearings 28 secured thereto preferably substantially in line with an axle 26, and is provided at one end with a hand wheel 29 for manually turning the shaft 27. A guideway 30 is secured to the frame 24 at each side of the shaft 27 and a hollow block 31, having a threaded orificed portion 32 and laterally extended base flanges 33, is mounted, one at each side of the truck 22, within the space between the guideways 30, the threaded portion 32 engaging the threads of the screw shaft 27 and the flanges 33 engaging the guideways 30.

The blocks are provided each with a series of pairs of open bearings 34 for supporting a shaft 35, upon which a pipe-supporting roller 36 is carried, within the hollow of the block. The successive pairs of bearings of the series are stepped downwardly and inwardly from the uppermost pair in a manner to provide a pair of bearings in each block corresponding as to height to a pair of bearings in the other block. Furthermore the two blocks are threaded upon the screw shaft 27 so that the pairs of bearings corresponding as to height will also correspond as to their distance from the extended vertical plane of the axis of the drum 3.

Therefore to accommodate the supporting rollers to pipes of different diameters within the range of the machine, all that is necessary is to place the shafts of the supporting rollers 36 in the proper corresponding pairs of bearings and to suitably adjust the positions of the blocks 31 transversely of the truck by turning the hand wheel 29 in one direction or the other. For pipes of smaller diameter, the roller shafts will be placed in higher bearings and the handle will be turned to move the blocks closer together. With pipes of larger diameter the reverse operation will be followed. Thus the pipe can be supported regardless of its diameter to maintain its axis horizontal, that is to say coincident with the axis of the drum 3. Also by moving the truck on its track, the rollers can be adjusted to support the pipe at any location longitudinally thereof. The truck is provided at its opposite end with another set of supporting rollers and mechanism similar to that already described, thereby distributing the load supported by the truck to each axle thereof. By using more than one truck the pipe may be supported at intermediate points and instead of moving the blocks 31 as shown merely by the threaded engagements and the hand wheel 29 there may be interposed reduction gears in the usual manner rendering the turning of the wheel easier. This may be desirable for at least one set of supporting rollers to facilitate raising the pipe as may be found necessary, after which the other pairs of supporting rollers may be, with little effort, brought into supporting engagement with the raised pipe. The pipes often are of great weight and size, those usually cut ranging from 24 to 72 inches in diameter. In practice ordinarily the appropriate truck is moved so that a pair of its supporting rollers will be located beneath the section of pipe that is to be cut off so that it will be amply supported during the cutting operation.

The machine further comprises a frame 37 having at its top tracks 38 upon which is mounted a carriage 39. The carriage comprises a frame 40, axles 41 journalled in bearings carried by the frame 40 and flanged wheels 42 mounted on the axles and supported on the tracks 38. A split sleeve 43 is carried by the frame 40 at its longitudinal center at one end thereof. Through this sleeve extends a rod 44 for a purpose later to be described. The sleeve is locked to the rod or released therefrom by means of a clamping screw 45 operating in the usual manner. The frame 40 is depressed longitudinally at its central portion to provide a passageway 46 for the rod 44.

A dove-tail groove 47 is formed in the frame 40 transversely thereof which engages a dove-tail plate 48 to permit the latter to be moved transversely of the carriage 39, that is to say toward and away from the pipe $a$. A roller 49 is mounted in the rear end of the plate 48 for engagement with the pipe and resilient means, such as the springs 50, are provided for yieldingly holding the roller in said engagement. The plate 48 supports the torch or other heat-applying device as will later appear, and the sliding connection of the plate with the carriage frame, the engagement of the roller 49, and the action of the springs 50 adapt the device, as is obvious, for cutting pipes of various diameters and insures the maintaining of a uniform distance between the torch and the pipe to be cut. It will be understood that the pipes often deviate considerably from perfect cylinders and that the constant engagement of the yieldingly mounted roller 49 with the outer face of the pipe will compensate for all such irregularities. The two springs 50 are respectively anchored at their rear ends to the rear corners of the frame 40 and at their forward ends to a pin or handle 51 made to fit any one of a row of spaced sockets 52 formed in the plate 48 along its center line. The pin 51 will be placed in the appropriate socket depending upon the diameter of the pipe $a$ to insure proper tension for the yielding engagement of the roller 49 with the pipe.

As previously stated, the invention is not limited to any particular type of burning appliance, and the use of the term "torch" in the claims is intended to apply to any well-known or preferred means or appliance employed in producing the cutting heat. However, a common and accepted method of heat-cutting pipe is by the employment of a torch flame of oxygen and acetylene, and therefore, for illustrative purposes, the end portion or nozzle of such a torch is indicated by dot and dash lines at 53 in Figs. 6 and 7. The torch, as is usual, will be connected with the two tanks supplying the required gases by flexible piping, the tanks being preferably carried on hand trucks so that they may be conveniently moved as the carriage 39 is moved along the tracks 38 to various parts of the pipe where the cuts are to be made. The end portion or nozzle 53 of the torch is all that is shown as the torch apparatus and manner of operating it is well known.

The machine comprises a holder for the heat-applying device, and while the design of this will vary for different devices in the present instance it is shown as comprising an angular holder 54, the horizontal leg of which being secured to the plate 48 in proximity to the roller 49 by a bolt 55. The vertical leg of the holder is provided with a split sleeve 56 which engages the nozzle 53, and a hand screw 57 is provided for clamping the nozzle tightly in the sleeve in the usual manner. The sleeve is so disposed vertically as to permit the end of the nozzle to be positioned to apply the heat to the pipe at a point substantially in the horizontal plane of the axis of the pipe. The holder as thus devised provides ready means for adjusting the nozzle at any angle to the pipe desired by merely turning the holder 54 about the bolt 55 before the bolt is tightened up, and the end of the nozzle may be brought the right distance from the pipe by adjusting it within its sleeve before the clamping screw is made tight. By such means the pipe may be severed by a bevel cut made at any desired angle. This is particularly desirous where the section of the pipe cut is to be welded to some other part, as for instance another section of the pipe, the bevel face thus providing a face of the welding groove usually employed. The roller 49 is disposed below the nozzle 53 and while it is not essential it is preferable that the pipe meet the roller before acted upon by the torch so as not to unduly interfere with the cutting operation. To this end the pipe would be revolved clockwise as viewed from the right in Fig. 1. In the present instance the machine is provided with two such holders 54 for two nozzles so that one or both may be used as desired but ordinarily both will be used. The holders 54 are adjusted to set the nozzles in directions converging toward the pipe, as best shown for example in Fig. 7. By the use of the two nozzles the section cut from the body of the pipe and also the body of the pipe will each be cut with a bevel face, the faces being oppositely directed, and the nozzles are so positioned that a minimum amount of waste will result. That is to say, the cut made will be as nearly a V in section as is practically possible.

By this manner of cutting pipes, sections, indicated by the letter b, may be cut, as for instance from a cylindrical pipe a', as shown in dot and dash lines in Fig. 8, or from a frusto-conical pipe a'', as shown in dot and dash lines in Fig. 9, the edges of the sections being bevelled. The sections are suitably arranged and welded together to form the shape of pipe desired. In Figs. 8 and 9 the sections are arranged and welded together to form elbows, the elbow of Fig. 8 being uniform in diameter and the elbow of Fig. 9 being of less diameter at one end than at the other. Adjacent ends of the sections form V shaped grooves open exteriorly for receiving the welding material. Fig. 10 shows a step in a former method of making a pipe section from a flat sheet of material. The sheet is cut along the lines c to provide the section b'. It is then rolled to bring the ends d—d together. These ends are then welded or otherwise secured together, forming the pipe sections. It will be appreciated that this method of forming pipe sections from flat sheets is slow and expensive compared to that of the present invention.

While the machine may cut a pipe along a line (circle) in a plane normal to the axis of the pipe, which will result when the carriage 39 is held stationary, the machine is primarily intended for cutting a pipe or similar object angularly crosswise of the pipe. To accomplish this, the carriage 39 must move along its tracks as the pipe rotates, and to perform a complete cut, entirely severing a section of the pipe from the body of the pipe, the carriage must have a reciprocatory movement making a complete reciprocation for a complete rotation of the pipe. Also to provide a cut edge that will, throughout its length, lie in a plane, the lineal speed of the wall of the pipe and the speed of the carriage must be uniform, furthermore the distances the carriage travels will determine the degree of angularity of the plane of the cut edge. The present machine is devised to accomplish these results.

The rod 44, which is shown as made of hollow pipe material, is slidably supported at its right end (Fig. 1) in a bearing formed in a post 58 secured to the frame 37. The opposite end of the frame 37, that is to say the left end as viewed in Fig. 1, has secured thereto two spaced plates 59 provided with elongated rectangular openings 60. A carriage 61, comprising a frame 62, axles 63, mounted in the sides of the frame, and wheels 64 mounted on the ends of the axles 63, is disposed between the plates 59 with a wheel 64 of each axle disposed in the opening 60 at the front and the other two wheels 64 disposed in the opening 60 at the rear. The wheels 64 are provided with flanges 65. The carriage 61 is thus held between the plates 59, the bottom edges of the openings 60 serving as tracks for the wheels and the top edges serving to prevent the carriage from raising off the track. The carriage 61 is thereby confined to reciprocating movement through the space between the plates 59 in a direction parallel to the axis of the drum 3. The carriage is provided with an orificed lug 66 extending downwardly below the frame 62 and the rod 44 extends at its left end (Fig. 1) through the orifice and is secured to the lug by nuts 67, this end of the rod being threaded to receive the nuts, one at each side of the lug.

The rod is supported from beneath at intermediate points by a number of rollers 68, two being shown in Fig. 1, one in upright active position and the other in inclined inactive position. The roller is grooved and the rod rests in the groove. The roller is freely mounted in the bifurcated upper end of an arm or lever 69 loaded at its lower end by the weight 70 and pivotally mounted intermediate its ends to the frame 37, as by the pin and bearings 71. The arm 69, due to its loaded lower end, will normally maintain a vertical position but may be swung from this position by the carriage 39 to permit the carriage to move to one side or the other of the support.

Fig. 1 shows one of the supports in normal vertical position and another support being forced to an inclined position by the carriage. This however is best shown in Figs. 5 and 6, in Fig. 5 a support being shown in both positions. The carriage is provided with a centrally located inverted track 72 which is positioned below the axles of the carriage and at each end beyond the axles inclines upwardly to a point just below and adjacent to the rod 44, where the track terminates, the inclined portion at the left (Fig. 5) being in line with the split sleeve 43. The inverted track 72 is thus disposed in line with the rollers 68, and when the inclined portion at either end (depending upon the direction of movement of the carriage) engages with a roller 68 it swings the arm and roller out of the path of the moving carriage, the roller riding on the inverted track until the carriage has passed, and then again engaging the rod in supporting relation therewith.

A ring 73 is pivotally mounted on the peripheral face 74 of the drum 3 at diametrically opposed points by the trunnions 75, thereby permitting the ring to be tilted to assume various angles to the axis of the drum. To best provide for this the face 74 of the drum is made convexly spherical in shape and the engaging inner face 76 of the ring is concaved to fit the face 74 so that the ring will be supported by the drum 3 at any angle the ring may assume. For purposes of assembling the ring is made in halves bolted together at diametrically opposite points by bolts 77. A peripheral flange serving as a track or cam 78 is formed on the ring 73 centrally thereof and rollers 79 are pivotally mounted on an arm 80 extending from the end of the frame 62 adjacent the ring. The rollers 79 are mounted one at each side of the cam 78 and in permanent engagement therewith. The peripheral face of the drum 3, preferably midway between the trunnions 75, is provided with concave worm teeth forming a rack 81 extending transversely of the drum and preferably conforming to the curvature of the face 74.

A worm 82 carried by the ring 73 engages the teeth of the rack 81. The cam 78 is provided with an orifice through which the worm extends and is further provided at each side with a bearing 83 in which the ends of the shaft of the worm 82 are mounted. The ends of the shaft extend beyond the bearings and are squared for the application of a socket wrench or other tool whereby the worm may be rotated to swing the ring about its trunnions. The amount of rotation of the worm determines the degree of the angle that the ring is swung and the face 74 of the drum 3 may be provided with a suitable scale (not shown) adjacent one of the bearings 83, and the bearing may serve as an index whereby the readings will provide an aid in determining the various positions for adjustment of the ring corresponding to the various cuts desired.

The operation of the device is as follows: Assuming the machine is in the position shown in Fig. 1, the worm 82 is turned to swing the ring 73 through the angle required to produce the desired cut in the pipe, it being assumed that the pipe is secured and supported in the machine as previously described. The amount that the ring is swung for any pipe will depend upon the angle of the plane at which the pipe is to be cut, increasing as the angle of the plane increases. It should, however, be noted that as the diameters of the pipes to be cut increase, the amount that the ring is to be swung will also be increased when producing cuts in planes of the same angularity.

For illustration it may be assumed that the angle through which the ring is required to be swung from the position shown in Fig. 1 and the direction thereof to effect a particular cut is that shown by the ring in Fig. 4. In such case the worm 82 is suitably turned to move the ring 73 from its position in Fig. 1 to its position in Fig. 4. Also let it be assumed that the axis of the trunnions 75 is vertical as shown in Fig. 4. In this position the part of the cam furthest to the left will be that portion at the front of the machine in the horizontal plane of the axis of the drum 3 and that part furthest to the right will be diametrically disposed at the rear of the machine. The axial distance between these two points will determine the length of throw or movement of the carriage 39 (also the rollers 79 and rod 44) and one complete rotation of the drum will produce a complete reciprocation of the carriage, rollers and rod. The carriage 39 is next moved along the rod 44 to bring the torch nozzles 53 to the proper position relative to the pipe, to produce the cut to be made, assuming in the present description of the operation that two torches are employed and that they have been adjusted to the proper angles as, for instance, those shown in Fig. 7. During this adjusting movement of the carriage the operator, by gripping the handle 51, may draw the plate 48 away from the pipe and at the same time move the carriage to its proper position. The clamp screw 45 is then tightened to firmly secure the carriage to the rod. As previously mentioned, the nozzles (or points of application of the heat) are substantially in the horizontal plane of the axis of the drum (or pipe), and, according to the setting of the parts as just described, the beginning of the cut will produce the portion thereof furthest to the left, as viewed in Fig. 1, which corresponds to the similar extreme position of the rollers 79 as shown in Fig. 4. And, similar to the position of the portion of the cam diametrically opposite to the rollers as shown in Fig. 4, the portion of the cut diametrically opposite the beginning of the cut will be at the furthest to the right.

The variable speed transmission 17 is then set to revolve the drum at a predetermined speed, which will depend upon the diameter of the pipe being cut, in order that a constant lineal speed of cutting may be obtained, say for instance 16 inches per minute (which has been found a practical speed), in order that the applied heat will have sufficient time to produce the cut.

The invention claimed and desired to be secured by Letters Patent is:

1. A machine for cutting by heat a pipe or similar object angularly crosswise comprising heat-applying means; means for supporting said pipe for rotation about its axis; means for rotating said pipe; a reciprocating carriage supporting said heat-applying means adapted to complete a reciprocatory movement in a direction longitudinally of said axis simultaneously with the completion of a rotation of said pipe whereby said pipe will be heat-cut along a line in a plane disposed at an angle to a plane normal to said axis; cam-operated means adapted for reciprocatory movement; a second carriage adapted for reciprocatory movement connected with said cam-operated means; means for confining said second carriage to said reciprocatory movement only; means connecting said carriages whereby said movement of said cam-operated means will effect said movement of said first mentioned carriage; and a cam engaging said cam-operated means, having connection with said pipe rotating means for rotation in unison with said rotation of said pipe, whereby said cam, during a complete rotation thereof, will effect said movement of said cam-operated means.

2. A machine for cutting by heat a pipe or similar object angularly crosswise comprising heat-applying means; means for supporting said pipe for rotation about its axis; means for rotating said pipe; reciprocating means supporting said heat-applying means adapted to complete a reciprocatory movement in a direction longitudinally of said axis simultaneously with the completion of a rotation of said pipe whereby said pipe will be heat-cut along a line in a plane disposed at an angle to a plane normal to said axis, said angle depending in degree upon the length of said movement; a drum having connection with said pipe rotating means for rotation in unison with said rotation of said pipe, the outer circumferential face of said drum being convexly spherically shaped; a ring-shaped cam having its inner face concavely spherically shaped engaging at its inner face the outer face of said drum adapting said cam to revolve upon said drum; means engaging said cam adapted for reciprocatory movement; means pivotally connecting said cam to said drum at diametrically opposite points whereby said cam will rotate with said drum and whereby said cam may be adjusted to varying angular positions relative to a plane normal to said axis, and will, during a complete rotation thereof, effect said movement of said cam engaging means, the length of said movement of said cam engaging means varying as the angular position of said cam varies; means connecting said cam engaging means with said reciprocating supporting means whereby said movement of said cam engaging means will effect said movement of said reciprocating supporting means, the length of said movement of said reciprocating supporting means varying as the length of said movement of said cam engaging means varies; and means for effecting said adjustment of said cam.

3. A machine for cutting by heat a pipe or similar object angularly crosswise comprising heat-applying means; means for supporting said pipe for rotation about its axis; means for rotating said pipe; a reciprocating carriage supporting said heat-applying means adapted to complete a reciprocatory movement in a direction longitudinally of said axis simultaneously with the completion of a rotation of said pipe whereby said pipe will be heat-cut along a line in a plane disposed at an angle to a plane normal to said axis; a track for supporting and guiding said carriage; cam-operated means adapted for reciprocatory movement; means, including a rod, connecting said cam-operated means with said carriage whereby said movement of said cam-operated means will effect said movement of said carriage; a cam engaging said cam-operated means, having connection with said pipe rotating means for rotation in unison with said rotation of said pipe whereby said cam, during a complete rotation thereof, will effect said movement of said cam-operated means; a lever device fulcrumed to a fixed part of said machine beneath said rod having an upper end normally supporting said rod from beneath, said device being disposed in the path of said carriage; and means on said carriage adapted to engage said device to swing same to permit said carriage to pass, said device being weighted at its lower end to permit it to automatically swing to normal position after the passing of said carriage.

4. A machine for cutting by heat a pipe or similar object angularly crosswise comprising a cam; means supporting said cam for rotation about a fixed axis; means for rotably supporting said pipe with its axis coincident with said fixed axis; means for rotating said cam and said pipe about said fixed axis; means engaging said cam for reciprocation thereby in a direction longitudinally of said fixed axis during said rotation of said cam, said cam being adjustable to planes of varying angles relative to the plane normal to said fixed axis for varying the lengths of said reciprocations; heat-applying means; means reciprocable in a direction longitudinally of said fixed axis supporting said heat-applying means; and means connecting said heat-applying means supporting means with said cam-engaging means whereby said reciprocations of said cam-engaging means will effect corresponding reciprocations of said heat-applying means supporting means.

5. A machine for cutting by heat a pipe or similar object angularly crosswise comprising a cam support adapted for rotation about a fixed axis; a cam carried by said support for rotation therewith about said fixed axis; means for supporting said pipe with its axis coincident with said fixed axis for rotation about said fixed axis; means for rotating said cam support, said cam and said pipe about said fixed axis; means engaging said cam for reciprocation thereby in a direction longitudinally of said fixed axis during said rotation of said cam, said cam being adapted to be tilted relative to its said support for adjustment thereof to planes of varying angles relative to the plane normal to said fixed axis for varying the length of said reciprocations; manually operated cam-actuating-means carried by said support for effecting said adjustment of said cam; heat-applying means; means reciprocable in a direction longitudinally of said fixed axis supporting said heat-applying means; and means connecting said heat-applying means supporting means with said cam-engaging means whereby said reciprocations of said cam-engaging means will effect corresponding reciprocations of said heat-applying means supporting means.

GEORGE K. HULL.
RALPH L. DRAKE.